Dec. 23, 1969   B. HORVATH   3,485,771

PLASMA ACTIVATION OF CATALYSTS

Filed Dec. 29, 1966

INVENTOR.
BERT HORVATH

BY *Young & Quigg*

ATTORNEYS

United States Patent Office

3,485,771
Patented Dec. 23, 1969

3,485,771
PLASMA ACTIVATION OF CATALYSTS
Bert Horvath, Bartlesville, Okla., assignor to Phillips
Petroleum Company, a corporation of Delaware
Filed Dec. 29, 1966, Ser. No. 605,822
Int. Cl. B01j 11/58, 11/64
U.S. Cl. 252—430     7 Claims

ABSTRACT OF THE DISCLOSURE

A method of activating a catalyst whereby a plasma produced by passing an activating gas through an electromagnetic field is contacted with the catalyst.

---

This invention relates to a process for catalyst activation.

Catalytic processes are of tremendous importance in producing both consumer and industrial goods. Typically, a catalyst is prepared and is then activated prior to use. In many cases catalysts are activated by passing a gas over the prepared catalyst at elevated temperatures.

The above method of activation has many disadvantages. Some of the disadvantages are more costly activation equipment, the need for more process equipment for heating and cooling, and the added cost of operating a process at higher temperatures.

I have discovered a process for activating catalysts at temperatures substantially lower than those known in the prior art. Broadly, this process comprises passing a gas through an electromagnetic field to form a plasma and contacting the plasma so formed with a catalyst to be activated. The term "plasma" as used in this application means a gas that has been passed through an electromagnetic field as hereinafter defined such that it contains free atoms, free electrons, and both neutral and ionized molecules, in ground and excited states. The term "activation" as used in this application will be defined as a process which renders a catalyst capable of forming a desired reaction product from a feed capable of yielding that product.

In one nonlimiting embodiment of this invention, catalysts comprising chromium oxide on silica-alumina are activated such that they are capable of forming polyethylene from an ethylene feed by treatment at ambient temperature with a plasma formed by passing air through an electromagnetic field. These catalysts, when activated conventionally at high temperatures, are known to effect polymerization of certain 1-olefins as disclosed in U.S. 2,825,721 issued to Hogan and Banks.

Accordingly, an object of this invention is to provide a process for activating catalysts at lower temperatures than taught by the prior art.

Another object of this invention is to provide a process for activating catalysts by treatment with a plasma formed by passing a gas through a magnetic field.

Another object of this invention is to provide a process for activating catalysts comprising chromium oxide associated with at least one oxide selected from the group consisting of silica, alumina, zirconia, and thoria by treatment with a plasma formed by passing air through an electromagnetic field.

Other objects, advantages, and features of this invention will be readily apparent to those skilled in the art from the following description, drawing, and appended claims.

Figure 1:
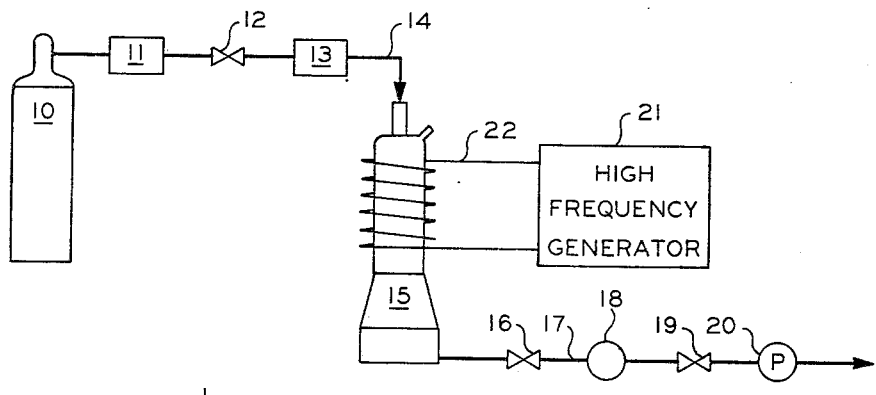

FIGURE 1 indicates one embodiment of this invention.

Figure 2:
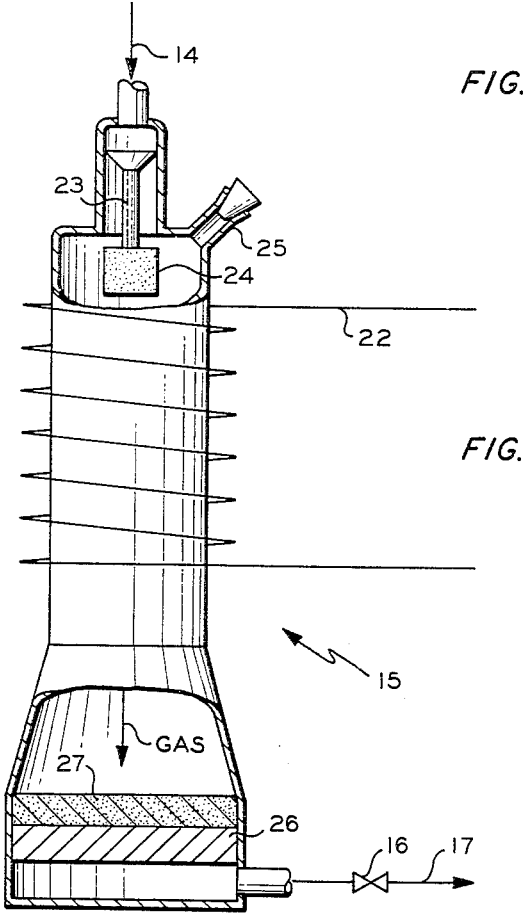

FIGURE 2 indicates a cross-sectional view of a portion of the apparatus of FIGURE 1.

With reference to FIGURE 1, there is indicated air storage tank 10, drier 11, valve 12, flow meter 13, gas conduit 14, activation vessel 15, valve 16, gas conduit 17, pressure gauge 18, valve 19, and vacuum pump 20. Additionally, there is indicated a generator of high frequency electrical potential 21 and inductance coil 22. The plasma is formed by the passage of air through the electromagnetic field of coil 22.

With reference to FIGURE 2, there is indicated capillary tube 23, gas filter 24, catalyst introduction passageway 25, porous platform 26, and catalyst bed 27 being subject to activation.

The method of the invention will now be described using the apparatus shown in FIGURES 1 and 2.

Initially, activation vessel 15 is charged with a catalyst to be activated. This is done by removing a stopper from the catalyst introduction passageway 25 and introducing a quantity of catalyst through passageway 25. This quantity of catalyst is then distributed evenly over porous platform 26 by a slight agitation. Porous platform 26 can comprise a platform constructed of any material that will not interfere with the catalyst activation process. In one embodiment, sintered glass was used satisfactorily. After the catalyst has been introduced, generator of high frequency electrical potential 21 is activated and a high frequency magnetic flux is generated within coil 22. Air is then caused to pass through the activation vessel 15, and hence through the magnetic field prior to contact with the catalyst. Initially, the passage of air through activation vessel 15 will be described.

According to this invention, a pressurized gas, specifically air in this embodiment, resides within storage tank 10. The gas is removed from storage tank 10 and is passed through activation vessel 15 by the action of vacuum pump 20. Thus, as valve 12 is opened, gas is dried in drier 11, conducted through valve 12 and flow meter 13, into activation vessel 15 by way of gas conduit 14. Drier 11 is provided so as to dry the activation gas since, according to this invention, only substantially dry gas can be used. Valve 12 and flow meter 13 are provided so the flow into activation vessel 15 can be regulated according to the concept of this invention. The gas then flows down capillary tube 23, through gas filter 24, and subsequently down activation vessel 15 through the electromagnetic field generated by coil 22 and generator of high frequency electrical potential 21. The air is converted to a plasma by the passage through the electromagnetic field. Gas filter 24 is provided to prevent the plugging of capillary tube 23 by catalyst particles. The plasma then flows through the catalyst bed 27, through porous platform 26, through valve 16 and conduit 17, and subsequently is discharged from vacuum pump 20. Valve 16 is used as a system shut-off and is open during the normal course of operation of the invention. Valve 19 and pressure gauge 18 are used to regulate the pressure within activation vessel 15 according to the concept of this invention. Thus, according to this invention, the catalyst in bed 27 has been activated by the plasma formed by passing air through the magnetic field of coil 22. Not shown in the drawings is an arrangement whereby dry nitrogen is introduced through valve 16 so as to maintain a slight positive pressure over the catalyst at the end of the plasma activation and prior to use. Of course it is fully within the scope of this invention to operate the above process on a full scale commercial basis.

According to this invention, plasmas from a variety of gases can be used to activate catalysts. Specifically, such gases as oxygen, nitrogen, hydrogen, gaseous carbon compounds such as carbon monoxide or carbon dioxide, gaseous nitrogen compounds such as the nitrogen oxides or ammonia, and inert gases such as helium or neon can be used; however, other gases can be used. It is within the scope of the invention to use plasmas formed from these gases sequentially, or to use plasmas formed from mixed gases, such as air, for catalyst activation.

The flow rate of the gas used to form the activating plasma is within the range of 10 to 10,000 volumes of gas (calculated at 32° F. and 14.7 p.s.i.a.) per volume of catalyst per hour. Plasma formation and catalyst activation is most frequently carried out at pressures below atmospheric, usually in the range of about 0.1 to about 100 mm. Hg, but any pressure at which a plasma forms can be used. Activating times of 10 minutes to 50 hours can be used.

The activating process of this invention is applicable to any catalysts capable of being made more active for a desired reaction by such treatment. It is usually used with solid so-called "heterogeneous" catalysts, but can be used with other catalysts. The process can be used in the activation of any of the catalysts used in the chemical and petrochemical industries in any type of process, such as alkylation, chemical synthesis, cracking and/or dealkylation, hydrogenation, dehydrogenation, isomerization, polymerization, hydrocracking, reforming and the like. It is usually preferred that the catalyst be dried prior to plasma activation.

In this invention the entire process can be conducted without benefit of external heat. Activation of the catalyst, however, usually results in the generation of heat and hence in the activation zone rising above ambient temperature. Since, according to this invention, the activation results from treatment with a plasma formed by passing the gas through a high frequency electromagnetic field, the temperature in the activation zone can be maintained at ambient temperature by the use of heat transfer devices, such as a water jacket, etc. In one embodiment, no heat transfer devices were employed and the temperature reached about 300° F. However, as has been previously stated, it is fully within the scope of this invention to maintain the activation zone at ambient temperature or lower.

Generaor of high frequency electrical potential 21 can comprise any means capable of impressing an electrical potential adequate to generate a magnetic flux density sufficient to cause a gas passed therethrough to activate the catalysts. Specifically, the Low-Temperature Asher Model LTA–600, sold by the Tracerlab, Inc., 2030 Wright Ave., Richmond, California, is applicable for this service. Other generators can be used that will generate the necessary magnetic flux at the necessary frequency. Generator of high frequency electrical potential 21 must be capable of generating an electromagnetic field having a frequency within the range of about 0.05 megacycle to about 300 megacycles. In one specific embodiment, a frequency of 13.5 megacycles was entirely satisfactory.

Coil 22 can be selected so as to produce the necessary flux density with the particular generator selected. In one embodiment, the coil sold for service with the above-mentioned Low-Temperature Asher is satisfactory for use in this invention. This coil is elongated, has a resistance of about 50 ohms, and consists of three turns of a cadmium-plated copper bar 1.25 cm. wide and 0.3 cm. thick, each turn measures about 3 cm. wide by 50 cm. long. The vertical distance between the turns is 2 cm. center-to-center and the coil has about 140 watts power loss when generating a magnetic field having a frequency of 13.5 megacycles. Other coils that can generate a field such that about 1 watt to about 5,000 watts net power is transferred into each cubic centimeter of gas can be used.

This invention is thus broadly applicable to activating a catalyst by contacting it with a plasma formed by passing a gas through a high frequency electromagnetic field.

As has been previously mentioned, the catalyst activated in the specific embodiments of this invention comprised chromium oxide associated with at least one oxide selected from the group consisting of silica, alumina, zirconia, and thoria. Additionally, for example, derivatives of boron and/or titanium can be incorporated into the catalyst. In one embodiment, a microspheroidal silica base containing about 0.1 weight percent alumina was impregnated with chromium trioxide. In another embodiment, the catalyst base was pretrated before impregnation with a titanium derivative, dried, and then activated. In still another embodiment, the pretreating material consisted of a boron derivative. Since the catalyst must be free of water prior to and during activation, the catalyst must be dried before introducing it into the activation zone, if there is water retained in the catalyst from the preparation steps.

Various modifications of this invention can be made in view of the foregoing disclosure and the appended claims without departing from the spirit or scope thereof.

EXAMPLE

The catalysts used to demonstrate the process of this invention were made using a microspheroidal silica base containing about 0.1 weight percent alumina. Four-gram portions of this material were pretreated as shown in Table I and were then impregnated with a solution containing 0.078 gram of chromium trioxide in about 30 ml. of pyridine and dried.

TABLE I

Catalyst A.—None.

Catalyst B.— Treated with 1.5 grams of titanium isopropoxide dissolved in about 30 ml. of toluene and dried.

Catalyst C.—Treated with 0.865 gram of ethyl borate dissolved in about 30 ml. of toluent and dried.

These catalysts were activated by exposure to a plasma formed by passing air through the magnetic field generated by the Low-Temperature Asher previously mentioned and tested for ethylene polymerization in 90-minute runs, using 0.06- to 0.08-gram portions of catalyst in a 3-liter reactor and the following technique: The reactor was warmed and flushed with dry nitrogen, and the catalyst (suspended in 1100 ml. of isopentane) was charged. The reactor was heated to 220° F. and ethylene was added as used to maintain a pressure of 450 p.s.i.g. The results are shown in Tables II and III. For comparison, polymer productivity with the non-activated catalyst is zero.

TABLE II.—LOW-TEMPERATURE PLASMA ACTIVATION [1]

| Catalyst | Pressure, mm. Hg | Air flow, v./v./hr.[2] | Time, hr. |
|---|---|---|---|
| A | 0.8–0.9 | 120 | 35.5 |
| B | 1.1–7.7 | 60–140 | 19.5 |
| C | 0.8–2 | 120–140 | 17.5 |

[1] Frequency=13.5 megacycles; power dissipation=140 watts; maximum catalyst temperature=175° F.
[2] Volumes at 32° F. and 14.7 p.s.i.a./volume of catalyst/hour.

TABLE III.—POLYMERIZATION

| Catalyst | Productivity, lb./lb. of catalyst in 90-minute runs | Melt index [1] |
|---|---|---|
| A | 3.7 | 0.023 |
| B | 23 | 6.2 |
| C | 15.8 | 9.6 |

[1] ASTM D 1238–62T, Condition E for polymer prepared using Catalysts A and B and Condition F for polymer prepared using Catalyst C.

As can be determined from examining Tables II and III, chromium oxide supported on a silica alumina base was activated so as to produce significant quantities of polymer at a variety of pressures, air flow rates, and times. Additionally, it is to be noted that the boron and titanium derivative pretreatment increased the catalyst productivity.

That which is claimed is:

1. The process of activating a catalyst comprising the steps of:
   (a) Placing a water-free catalyst consisting of chromium oxide associated with at least one oxide selected from the group consisting of silica, alumina, zirconia and thoria within a catalyst activation zone;
   (b) Passing an activating gas from the group consisting of air and oxygen through an electromagnetic field to form a plasma, wherein the power dissipation by the field is in the range of 1 to 250 watts per gram of catalyst, and
   (c) Contacting said plasma with the catalyst to be activated.

2. The process of claim 1 in which the frequency of said electromagnetic field is in the range of 0.05 megacycles to 300 megacycles.

3. The process of claim 1 in which the pressure in said catalyst activation zone is in the range of about 0.1 to about 100 mm. Hg, the flow of gas to the plasma-forming zone is in the range of 10 to 10,000 volumes per volume of catalyst per hour, and the time is in the range of 10 minutes to 50 hours.

4. The process of claim 2 wherein the catalyst is selected from the group: (a) chromium oxide associated with at least one oxide selected from the group consisting of silica, alumina, zirconia, and thoria; and (b) the catalysts of group (a) additionally comprising compounds selected from the group consisting of compounds of titanium and boron.

5. The process of claim 4 wherein a catalyst consisting of a microspheroidal silica base containing about 0.1 weight percent alumina impregnated with chromium trioxide is activated by introducing 120 v./v./hr. of air from 0.8 to 0.9 mm. Hg pressure for about 36 hours to a plasma-forming zone and passing said plasma over said catalyst; wherein said catalyst is activated so as to polymerize ethylene to polyethylene with a melt index of 0.023 in the ratio of 3.7 lb. of ethylene per lb. of catalyst.

6. The process of claim 4 wherein a catalyst consisting of a microspheroidal silica base containing about 0.1 weight percent alumina treated with titanium isopropoxide and impregnated with chromium trioxide is activated by introducing 60 to 140 v./v./hr. of air at from 1.1 to 7.7 mm. Hg pressure for about 20 hours to a plasma-forming zone and passing said plasma over said catalyst; wherein said catalyst is activated so as to polymerize ethylene to polyethylene with a melt index of 6.2 in the ratio of 23 lb. of ethylene per lb. of catalyst.

7. The process of claim 4 wherein a catalyst consisting of a microspheroidal silica base containing about 0.1 weight percent alumina treated with ethyl borate and impregnated with chromium trioxide is activated by introducing 120 to 140 v./v./hr. of air at from 0.8 to 2 mm. Hg pressure for about 18 hours from a plasma-forming zone and passing said plasma over said catalyst; wherein said catalyst is activated so as to polymerize ethylene to polyethylene with a high load melt index of 9.6 in the ratio of 15.8 lb. of ethylene per lb. of catalyst.

References Cited

UNITED STATES PATENTS

| 1,865,180 | 6/1932  | Faragher     | 252—410 |
| 2,985,597 | 5/1961  | Aye et al.   | 252—467 |
| 2,987,487 | 6/1961  | Stevens et al. | 252—467 |
| 3,151,944 | 10/1964 | Stevens et al. | 252—467 |
| 3,235,508 | 2/1966  | Mills        | 252—465 |
| 3,264,226 | 7/1966  | Johnson      | 252—465 |

DANIEL E. WYMAN, Primary Examiner

P. E. KONOPKA, Assistant Examiner

U.S. Cl. X.R.

252—410, 431, 432, 455, 458, 465, 467, 469; 260—88.2, 94.7, 94.9